(12) United States Patent
Akahori

(10) Patent No.: US 8,391,348 B2
(45) Date of Patent: Mar. 5, 2013

(54) APPARATUS AND METHOD FOR DETECTING INTERFERENCE WAVE

(75) Inventor: Hiroji Akahori, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 579 days.

(21) Appl. No.: 12/609,250

(22) Filed: Oct. 30, 2009

(65) Prior Publication Data

US 2010/0124267 A1    May 20, 2010

(30) Foreign Application Priority Data

Nov. 14, 2008    (JP) ................. 2008-292018

(51) Int. Cl.
    *H04L 27/01*    (2006.01)
(52) U.S. Cl. ........ 375/232; 375/260; 375/346; 375/316; 375/285
(58) Field of Classification Search .......... 375/232, 375/260, 346, 316, 285
    See application file for complete search history.

(56) References Cited

U.S. PATENT DOCUMENTS 7,424,072 B2 *  9/2008  Hayashi et al. ............ 375/346
7,653,162 B2 *  1/2010  Hayashi et al. ............ 375/346
2004/0218520 A1 * 11/2004  Aizawa ..................... 370/203
2006/0262715 A1 * 11/2006  Taniguchi .................. 370/208
2008/0198942 A1 *  8/2008  Akella et al. ............... 375/260

FOREIGN PATENT DOCUMENTS

JP    2000-115087    4/2000

* cited by examiner

*Primary Examiner* — Siu Lee
(74) *Attorney, Agent, or Firm* — Volentine & Whitt, PLLC

(57) ABSTRACT

An interference wave detecting apparatus includes a first Fourier transformer for frequency-converting a received signal; an extractor for extracting a known information signal from the frequency-converted received signal; an interpolator for performing interpolation to the known information signal in frequency domain, generating a first transmission path estimation signal as a frequency-domain information signal; an inverse Fourier transformer for inverse-Fourier-transforming the known information signal, generating a time-domain information signal; a waveform shaping section for shaping a waveform of the time-domain information signal; a second Fourier transformer for Fourier-transforming the shaped time-domain information signal, generating a second transmission path estimation signal as a frequency-domain information signal; and a comparing-computing section for comparing the first and second transmission path estimation signals, generating an interference wave detection result which indicates a ratio of an interference wave of the received signal.

14 Claims, 4 Drawing Sheets

APPARATUS AND METHOD FOR DETECTING INTERFERENCE WAVE

BACKGROUND OF THE INVENTION

1. Field of the Invention

The present invention relates to an apparatus and method for detecting an interference wave in a desired receiving band in a receiver or the like, which demodulates a received signal using, for example, a fast Fourier transform (FFT) scheme such as Orthogonal Frequency Division Multiplexing (OFDM), and also relates to an equalizer incorporating such apparatus.

2. Description of the Related Art

Conventionally, in the Integrated Services Digital Broadcasting-Terrestrial (ISDB-T) or the like, the transmission path estimation of an OFDM modulated signal (hereinafter referred to as an "OFDM signal") in a receiver is performed as described in, for example, patent document 1 (Japanese Patent Kokai Publication No. 2000-115087). The apparatus in patent document 1 frequency-converts an OFDM digital baseband signal using FFT; extracts a desired signal such as a scattered pilot (SP) signal in ISDB-T; obtains the amplitude-frequency characteristic and phase-frequency characteristic on the basis of the extracted SP signal; generates a delay profile (electric power relative to a delay time) by inverse-fast-Fourier-transforming (IFFT) the amplitude-frequency characteristic and phase-frequency characteristic; and generates a transmission path estimation signal using the delay profile. Furthermore, the same holds true for an apparatus using a known information signal (pilot signal) other than the SP signal.

In the conventional receiver, when a unique interference wave is mixed into a desired signal wave, an OFDM signal is deformed and therefore the receiving characteristic is degraded. In order to suppress such degradation, the receiver needs to have a means that can detect interference waves.

However, in the conventional method of the transmission path estimation, the presence or absence of the interference wave cannot be detected. Therefore, in the conventional method of the transmission path estimation, when the interference wave power is large, the interference wave power is superimposed on not only subcarriers near the interference wave but also the other subcarriers apart from the interference wave, and therefore the interference wave power exerts an influence upon subcarrier information of the subcarriers around a subcarrier where the interference wave power exits. As a result, the demodulated signal generated by equalizing processing using the transmission path estimation signal as it is, includes an error of the transmission path estimation information itself, and therefore the occurrence frequency of the demodulation errors increases undesirably.

Furthermore, if there is an error correcting encoder such as a viterbi encoder at the later stage, which uses reliability information (which indicates a degree of reliability of a signal obtained from electric power or amplitude of each subcarrier or the like on the basis of the transmission path estimation result generated from a known signal.) as a soft decision result, the subcarrier information of the subcarriers which have been subjected to larger influence of the interference wave, is determined to have higher reliability information undesirably. Accordingly, there is a problem that even if the subcarrier information has high probability of error, it is regarded as reliable information and is input to an error correction encoder, and therefore the error correction performance decreases.

SUMMARY OF THE INVENTION

The object of the present invention is to provide an apparatus and method that can detect an interference wave in a received signal and outputs a detection signal quantitatively and precisely indicating a ratio of the interference wave to a desired signal wave, and to provide an equalizer incorporating such apparatus.

According to one aspect of the present invention, an interference wave detecting apparatus includes: a first Fourier transformer for frequency-converting a received signal using Fourier transform, thereby generating a frequency-converted received signal; an extractor for extracting a known information signal from the frequency-converted received signal; an interpolator for performing interpolation to the known information signal in frequency domain, thereby generating a first transmission path estimation signal as a frequency-domain information signal; an inverse Fourier transformer for inverse-Fourier-transforming the known information signal, thereby generating a time-domain information signal; a waveform shaping section for shaping a waveform of the time-domain information signal, thereby generating a shaped time-domain information signal; a second Fourier transformer for Fourier-transforming the shaped time-domain information signal, thereby generating a second transmission path estimation signal as a frequency-domain information signal; and a comparing-computing section for comparing the first transmission path estimation signal and the second transmission path estimation signal, thereby generating an interference wave detection result which indicates a ratio of an interference wave of the received signal.

According to another aspect of the present invention, an equalizer includes above-mentioned interference wave detecting apparatus; a selecting/combining section for selecting one of the first and second transmission path estimation signals or synthesizing the first and second transmission path estimation signals, thereby outputting the selected signal or the synthesized signal; and a scaler for dividing the selected signal or the synthesized signal by the interference wave detection result, thereby generating a subcarrier signal intensity.

According to another aspect of the present invention, an interference wave detecting method includes the steps of: receiving a signal and frequency-converting the received signal using Fourier transform, thereby generating a frequency-converted received signal; extracting a known information signal from the frequency-converted received signal; performing interpolation to the known information signal in frequency domain, thereby generating a first transmission path estimation signal as a frequency-domain information signal; inverse-Fourier-transforming the known information signal, thereby generating a time-domain information signal; shaping a waveform of the time-domain information signal, thereby generating a shaped time-domain information signal; Fourier-transforming the shaped time-domain information signal, thereby generating a second transmission path estimation signal as a frequency-domain information signal; and comparing the first transmission path estimation signal and the second transmission path estimation signal, thereby generating an interference wave detection result which indicates a ratio of an interference wave of the received signal.

The interference wave detecting apparatus and method according to of the present invention can obtain an interference wave detection result quantitatively and precisely indicating a ratio of the interference wave to the desired signal wave.

The equalizer according to the present invention can lower the level of the reliability information of subcarriers which are being subject to larger interference wave power, and therefore erroneous determination in error correction process can be reduced and a Bit error rate (BER) can be improved.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
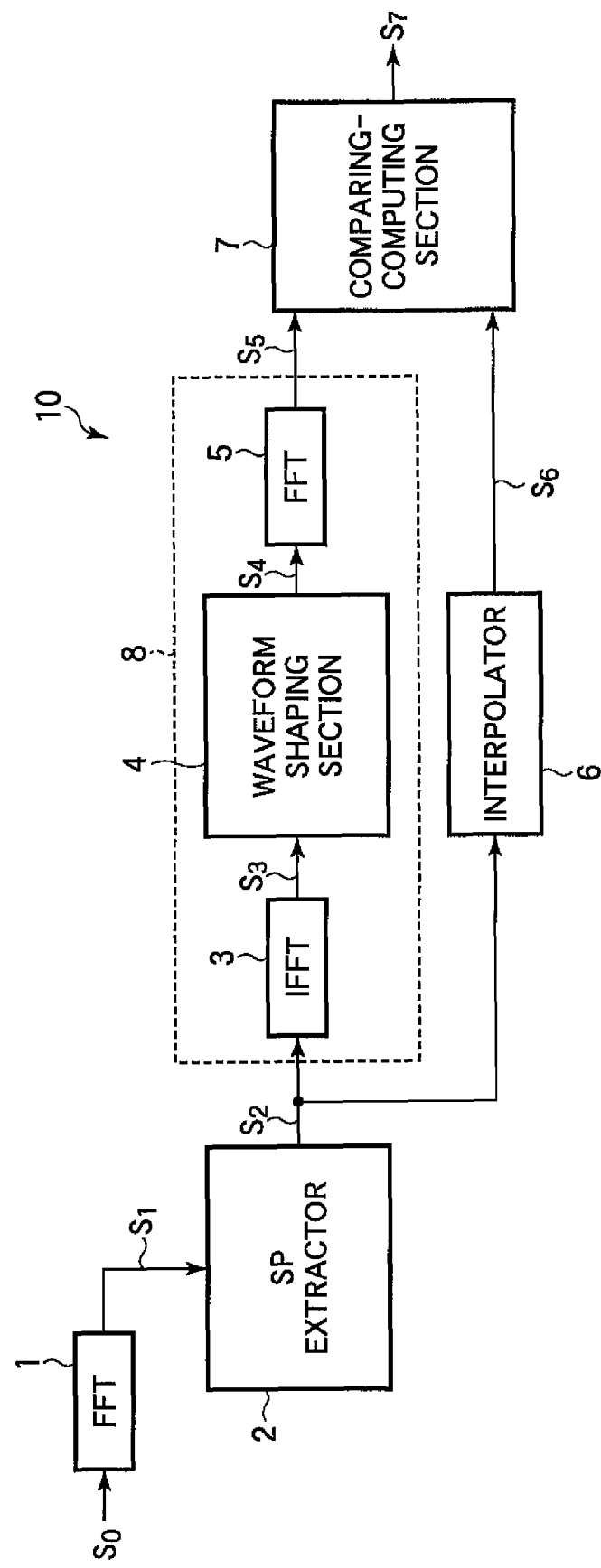
FIG. 1 is a block diagram showing a schematic configuration of an interference wave detecting apparatus according to the first embodiment of the present invention.

FIG. 1 is a block diagram showing a schematic configuration of an interference wave detecting apparatus 10 according to the first embodiment of the present invention. Referring to FIG. 1, the interference wave detecting apparatus 10 includes a first Fourier transformer which is, for example, a first fast Fourier transform (FFT) section 1; an extractor which is, for example, a scattered pilot (SP) extractor 2; an interpolator 6 such as an interpolating filter; an inverse Fourier transformer which is, for example, an inverse fast Fourier transform (IFFT) section 3; a waveform shaping section 4; a second Fourier transformer which is, for example, a second fast Fourier transform (EFT) section 5; and a comparing-computing section 7. The IFFT section 3, the waveform shaping section 4, and the second FFT section 5 are connected in series and constitute a series-connected-circuit section 8.

The first FFT section 1 receives a signal (e.g., an OFDM signal of ISDB-T) $S_0$ and frequency-converts the received signal $S_0$ using FFT, thereby generating a frequency-converted received signal (e.g., an FFT processing result $S_1$ of OFDM spectrum). An output terminal of the first FFT section 1 is connected to the SP extractor 2.

The SP extractor 2 extracts a known information signal (e.g., an SP signal) $S_2$ from the frequency-converted received signal such as the FFT processing result $S_1$. An output terminal of the SP extractor 2 is connected to both the IFFT section 3 of the series-connected-circuit section 8 and the interpolator 6. The IFFT section 3 inverse-Fourier-transforms the SP signal $S_2$ as a known information signal, thereby generating a time-domain information signal $S_3$ as a transmission path estimation signal. An output terminal of the IFFT section 3 is connected to the waveform shaping section 4.

The waveform shaping section 4 shapes a waveform of the time-domain information signal $S_3$, thereby generating a shaped time-domain information signal $S_4$. Specifically, the waveform shaping section 4 receives the time-domain information signal $S_3$; compares a waveform of the received time-domain information signal $S_3$ with a threshold TH; outputs the waveform of the received time-domain information signal $S_3$ as it is when the waveform of the received time-domain information signal $S_3$ exceeds the threshold TH; and outputs a logical "0" or a suppressed signal level of the received time-domain information signal $S_3$ when the waveform of the received time-domain information signal $S_3$ does not exceed the threshold TH. The threshold TH is a value determined by multiplexing an integral value of the received time-domain information signal $S_3$ in a predetermined time interval or a maximum value of the received time-domain information signal $S_3$ in a predetermined time interval by a predetermined coefficient. An output terminal of the waveform shaping section 4 is connected to the FFT section 5.

The FFT section 5 Fourier-transforms the shaped time-domain information signal $S_4$, thereby generating a second transmission path estimation signal $S_5$ as a frequency-domain information signal. An output terminal of the FFT section 5 is connected to the comparing-computing section 7.

The interpolator 6 such as the interpolating filter performs interpolation to the SP signal $S_2$ as the known information signal in frequency domain, thereby generating a first transmission path estimation signal $S_6$ as a frequency-domain information signal. An output terminal of the interpolator 6 is connected to the comparing-computing section 7. The interpolating filter may be configured by a digital filter such as a finite impulse response (FIR) filter.

The comparing-computing section 7 compares the first transmission path estimation signal $S_6$ output from the interpolator 6 and the second transmission path estimation signal $S_5$ output from the FFT section 5, thereby generating an interference wave detection result $S_7$ (e.g., interference wave power information) which indicates a ratio of an interference wave of the received signal $S_0$. The interference wave detection result $S_7$ may be obtained by comparing power levels of the first transmission path estimation signal $S_6$ and the second transmission path estimation signal $S_5$, and dividing a dividend which is a larger one of the power levels by a divisor which is a smaller one of the power levels, thereby generating the interference wave detection result $S_7$ from a result of the dividing. Alternatively, the interference wave detection result $S_7$ may be obtained by comparing power levels of the first transmission path estimation signal $S_6$ and the second transmission path estimation signal $S_5$, and dividing a dividend which is a smaller one of the power levels by a divisor which is a larger one of the power levels, thereby generating the interference wave detection result $S_7$ from a result of the dividing.

Figure 2:
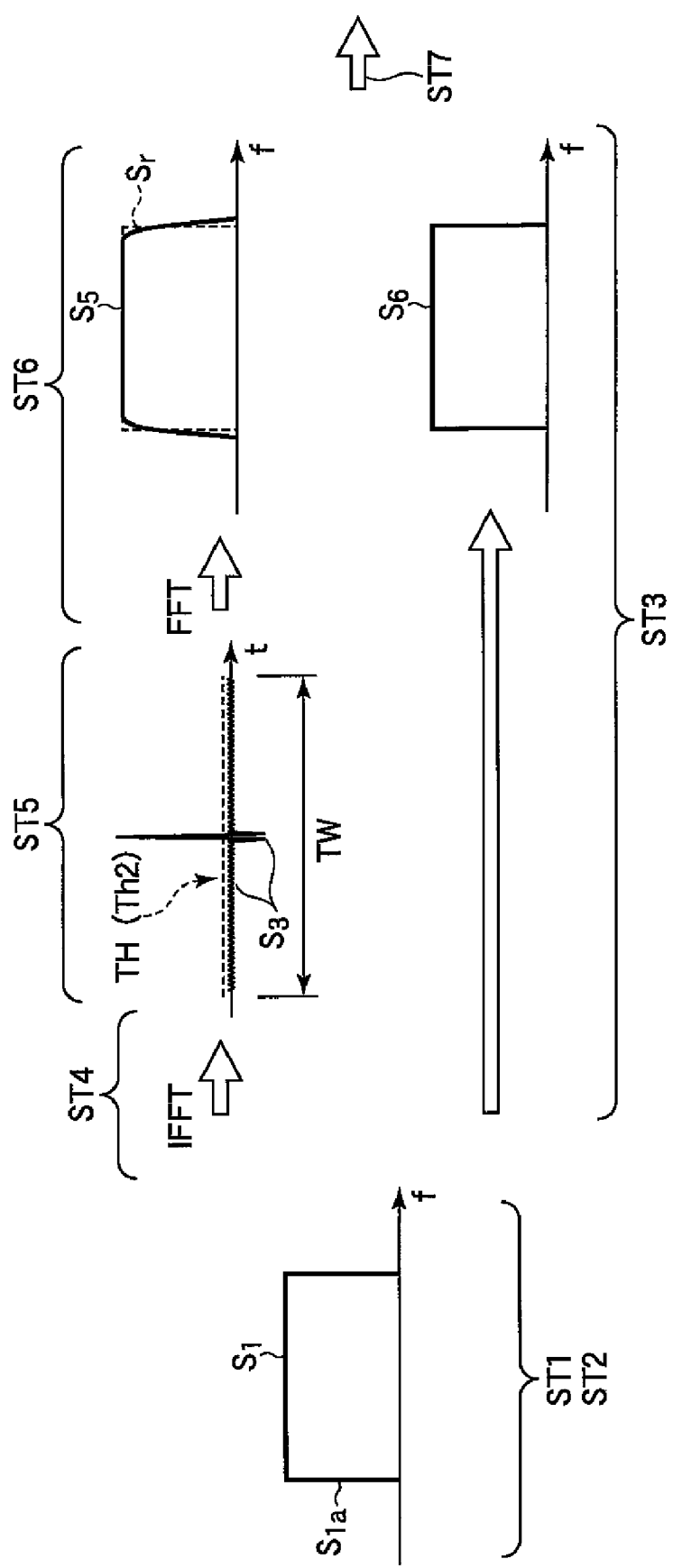
FIG. 2 is an explanatory diagram illustrating operation of the interference wave detecting apparatus according to the first embodiment when there is no in-band interference wave.
Figure 3:
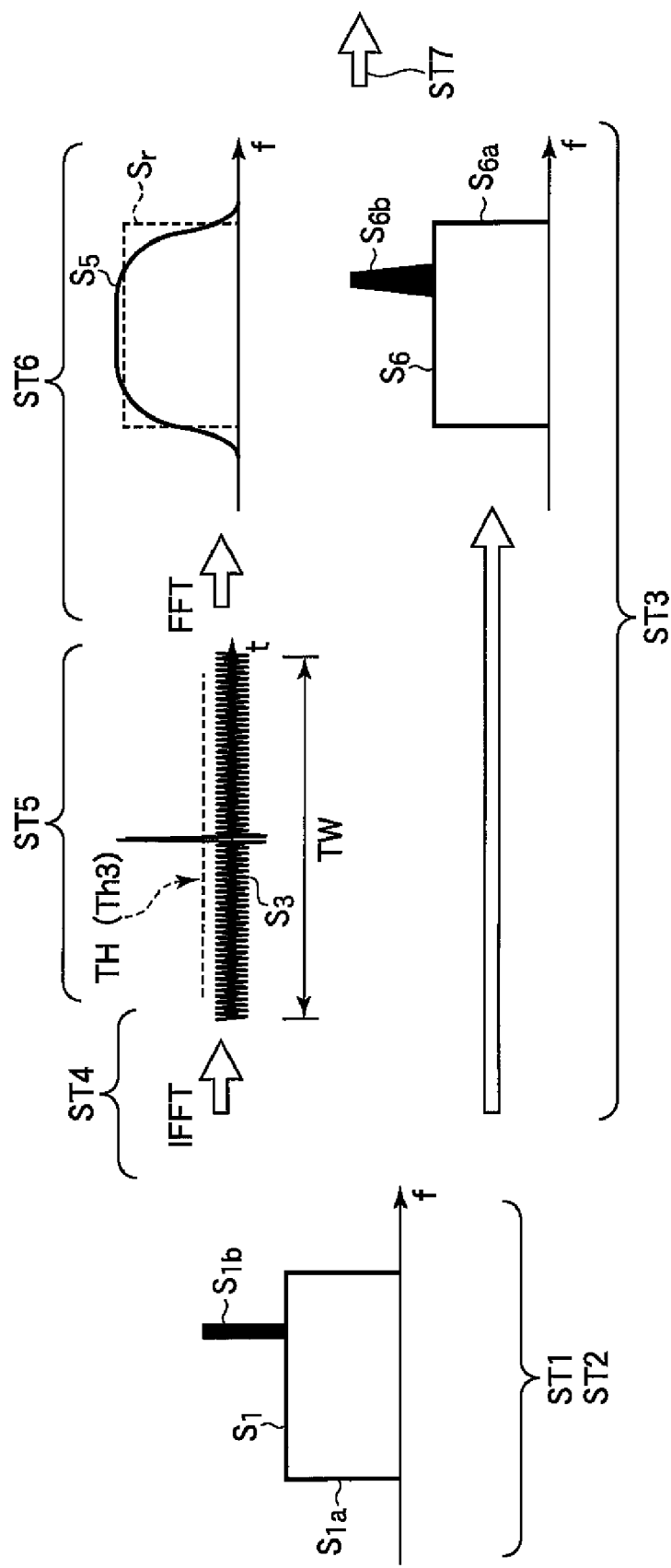
FIG. 3 is an explanatory diagram illustrating operation of the interference wave detecting apparatus according to the first embodiment when there is an in-band interference wave.

FIG. 2 is an explanatory diagram illustrating operation of the interference wave detecting apparatus 10 when there is no in-band interference wave, and FIG. 3 is an explanatory diagram illustrating operation of the interference wave detecting apparatus 10 when there is an in-band interference wave. In FIG. 2 and FIG. 3, "f" denotes a frequency axis, and "t" denotes a time axis.

A description will be made as to an interference wave detecting method which can be performed in the interference wave detecting apparatus 10 with reference to FIG. 1 to FIG. 3. The interference wave detecting method includes, for example, (Step ST1) receiving a signal and frequency-converting the received signal $S_0$ using Fourier transform, thereby generating a frequency-converted received signal $S_1$; (Step ST2) extracting a known information signal $S_2$ from the frequency-converted received signal $S_1$; (Step ST3) performing interpolation to the known information signal $S_2$ in frequency domain, thereby generating a first transmission path estimation signal $S_6$ as a frequency-domain information signal; (Step ST4) inverse-Fourier-transforming the known information signal $S_2$, thereby generating a time-domain information signal $S_3$; (Step ST5) shaping a waveform of the time-domain information signal $S_3$, thereby generating a shaped time-domain information signal $S_4$; (Step ST6) Fourier-transforming the shaped time-domain information signal $S_4$, thereby generating a second transmission path estimation signal $S_5$ as a frequency-domain information signal; and (Step ST7) comparing the first transmission path estimation signal $S_6$ and the second transmission path estimation signal $S_5$, thereby generating an interference wave detection result $S_7$ which indicates a ratio of an interference wave of the received signal $S_0$.

In Step ST1, the FFT section 1 receives a signal $S_0$ and frequency-converts the received signal $S_0$ using FFT, and outputs a frequency-converted received signal $S_1$ as the FFT processing result, as shown in FIG. 1 to FIG. 3. When there is no in-band interference wave in the received signal $S_0$, the waveform of the frequency-converted received signal $S_1$ as the FFT processing result is a rectangular waveform (OFDM spectrum) $S_{1a}$, as shown in FIG. 2. On the other hand, when there is an in-band interference wave in the received signal $S_0$, the waveform of the frequency-converted received signal $S_1$ as the FFT processing result includes not only a rectangular waveform (OFDM spectrum) $S_1$, but also an interference wave component $S_{1b}$ appearing above the rectangular waveform $S_{1a}$, as shown in FIG. 3.

In Step ST2, the SP extractor 2 extracts the SP signal $S_2$ as the known information signal from the frequency-converted received signal $S_1$ to supply the extracted SP signal $S_2$ to the IFFT section 3 and the interpolator 6.

In Step ST3, the interpolator 6 performs interpolation filtering processing to the SP signal $S_2$ as the known information signal in frequency domain using the digital filter such as an FIR filter, generates the first transmission path estimation signal $S_6$ as a frequency-domain information signal, and supplies it to the comparing-computing section 7, as shown in FIG. 2 and FIG. 3. When there is an in-band interference wave in the received signal $S_0$, the interference wave component $S_{6b}$ appears above the spectrum $S_{6a}$ of the frequency-domain information signal $S_6$, as shown in FIG. 3.

In Step ST4, the IFFT section 3 performs IFFT processing to the SP signal $S_2$ as the known information signal, generates the time-domain information signal $S_3$ as the transmission path estimation signal, and supplies it to the waveform shaping section 4. The time-domain information signal $S_3$ is obtained by converting the IFFT processing result of the SP signal to a value of electric power. The arrival time t and the electric power of the signal $S_1$ are illustrated in FIG. 2 and FIG. 3. In FIG. 3, since the signal $S_1$ has an in-band interference wave component $S_{1b}$, the interference wave power is superimposed on the subcarrier.

In Step ST5, the waveform shaping section 4 receives the time-domain information signal $S_3$; compares a waveform of the received time-domain information signal $S_3$ with the threshold TH; outputs the waveform of the received time-domain information signal $S_3$ as it is when the waveform of the received time-domain information signal $S_3$ exceeds the threshold TH; and outputs a logical "0" or a suppressed signal level of the received time-domain information signal $S_3$ when the waveform of the received time-domain information signal $S_3$ does not exceed the threshold TH. The threshold TH is a value determined by multiplexing an integral value of the received time-domain information signal $S_3$ in a predetermined time interval or a maximum value of the received time-domain information signal $S_3$ in a predetermined time interval by a predetermined coefficient. An output terminal of the waveform shaping section 4 is connected to the FFT section 5. The threshold TH is set to, for example, a value determined by multiplexing the maximum power or an integral of the power within a desired time window (for the sake of convenience, a time length shown by the transmission path estimation signal $S_3$ as the time-domain information signal in FIG. 2 and FIG. 3 is regarded as a time window TW.) by a predetermined coefficient which is less than a value of 1. Accordingly, a value Th3 of the threshold TH when there is an in-band interference wave as shown in FIG. 3 is larger than a value Th2 of the threshold TH when there is no in-band interference wave as shown in FIG. 2.

In Step ST6, the FFT section 5 performs FFT processing to the waveform shaped time-domain information signal $S_4$, generates the second transmission path estimation signal $S_5$ as a frequency-domain information signal, and supplies it to the comparing-computing section 7. When there is an in-band interference wave $S_{1b}$ in the signal $S_1$, rising and falling edges of the spectrum of the frequency-domain information signal $S_5$ are deformed with reference to a reference waveform $S_r$ as shown in FIG. 3.

In Step ST7, the comparing-computing section 7 compares the first transmission path estimation signal $S_6$ generated through the interpolation processing and the second transmission path estimation signal $S_5$ generated through the IFFT, shaping, and FFT processing, and performs computation using the following equation (1) to generate an interference wave detection result $S_7$ (e.g., interference wave power information) which indicates a ratio of an interference wave of the received signal $S_0$.

$$Itf(\text{sub\_c}) = \begin{cases} REPfft(\text{sub\_c}) / REPfilter(\text{sub\_c}), & \text{when } REPfft(\text{sub\_c}) > REPfilter(\text{sub\_c}). \\ REPfilter(\text{sub\_c}) / REPfft(\text{sub\_c}), & \text{when } REPfft(\text{sub\_c}) \leq REPfilter(\text{sub\_c}). \end{cases} \quad (1)$$

In the equation (1), "sub_c" denotes a subcarrier number, "Itf(sub_c)" denotes a value indicating the influence exerted by the interference wave, "REPfft(sub_c)" denotes a transmission path estimation signal (frequency-domain information signal $S_5$) generated using the IFFT, shaping, and FFT processing, and "REPfilter(sub_c)" denotes a transmission path estimation signal (frequency-domain information signal $S_6$) generated by the interpolating filter. When REPfft(sub_c) is larger than REPfilter(sub_c), the division on an upper row of the equation (1) is performed. Alternatively, when REPfft(sub_c) is not larger than REPfilter(sub_c), the division on a lower row of the equation (1) is performed.

According to the first embodiment, the interference wave detecting apparatus or method can obtain the precise quantitative interference wave power information $S_7$ indicating a ratio of the interference wave in the desired signal wave.

Furthermore, the interference wave power information $S_7$ may be obtained by another equation other than the equation (1).

Moreover, in the first embodiment, the frequency-domain information signal $S_5$ as the transmission path estimation signal obtained by FFT processing has some inevitable deformation in both side portions of the spectrum of the transmission path estimation signal (time-domain information signal) resulting from the signal conversion using the threshold TH. However, the frequency-domain information signal $S_5$ having some inevitable deformation can be used as it is or can be utilized after eliminating only the processing result of the subcarrier of the deformed signal in frequency domain.

Second Embodiment

Figure 4:
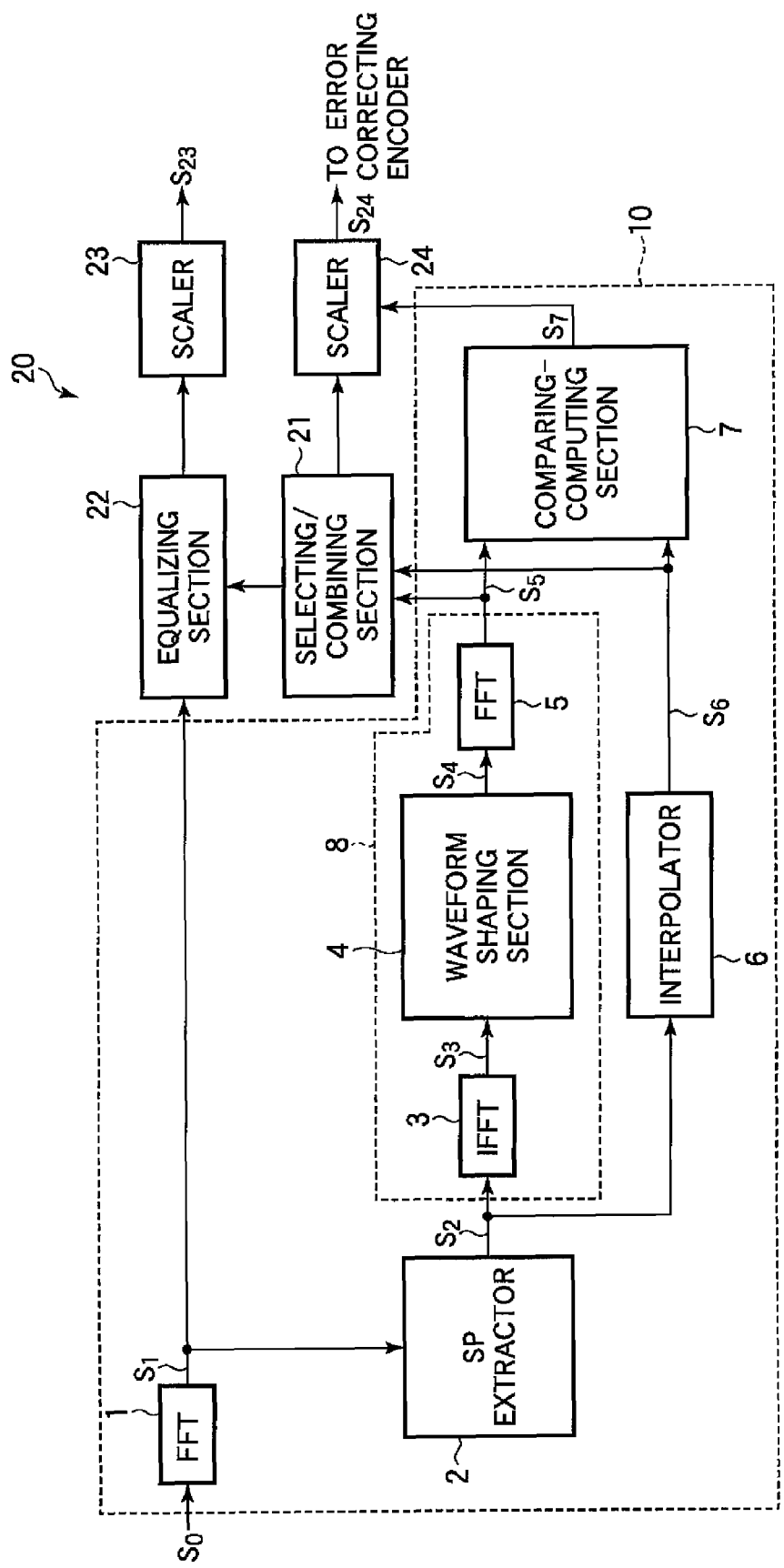
FIG. 4 is a block diagram showing a schematic configuration of an equalizer including an interference wave detecting apparatus according to the second embodiment of the present invention.

FIG. 4 is a block diagram showing a schematic configuration of an equalizer 20 including the interference wave detecting apparatus 10 according to the second embodiment of the present invention. In FIG. 4, constituent elements that are the same as or correspond to those in FIG. 1 are assigned the same reference numerals or symbols. The equalizer 20 according to the second embodiment aims to correct a code error resulting from fading, noise, or the like. As shown in FIG. 4, the equalizer 20 includes the interference wave detecting apparatus 10 which has been already described in the first embodiment, a selecting/combining section 21, an equalizing section 22, a scaler 23, and a scaler 24. An output terminal of the FFT section 5 and an output terminal of the interpolator 6 are connected to the selecting/combining section 21.

The selecting/combining section 21 selects one of the frequency-domain information signal $S_5$ output from the FFT section 5 and the frequency-domain information signal $S_6$ output from the interpolator 6 and outputs the selected signal, or synthesizes the frequency-domain information signal $S_5$ and the frequency-domain information signal $S_6$ to output the synthesized signal. An output terminal of the selecting/combining section 21 and an output terminal of the FFT section 1 are connected to the equalizing section 22.

The equalizing section 22 corrects a code error of the FFT processing result (the frequency-converted received signal) $S_1$ output from the FFT section 1 on the basis of the output signal of the selecting/combining section 21. An output terminal of the equalizing section 22 is connected to the scaler 23.

The scaler 23 generates an I/Q signal $S_{23}$ from the output signal of the equalizing section 22 and outputs it. An output terminal of the selecting/combining section 21 and an output terminal of the comparing-computing section 7 are connected to the scaler 24.

The scaler 24 divides the output signal of the selecting/combining section 21 by the interference wave power information $S_7$ (i.e., Itf(sub_c) which is a value indicating influence of the interference wave of the equation (1)) output from the comparing-computing section 7, thereby generating a subcarrier signal intensity $S_{24}$ and sending it to an error correcting encoder such as a viterbi encoder (not shown in the drawings).

In the equalizer 20 having the above-mentioned configuration, when the received signal $S_0$ is input, it is frequency-converted through FFT processing by the FFT section 1 and the FFT processing result $S_1$ is output. The FFT processing result $S_1$ is processed by the interference wave detecting apparatus 10, the frequency-domain information signals $S_5$ and $S_6$ output from the FFT section 5 and the interpolator 6 respectively is supplied to the selecting/combining section 21, and the interference wave power information $S_7$ (i.e., Itf(sub_c) which is a value indicating the influence by the interference wave) output from the comparing-computing section 7 is supplied to the scaler 24. The selecting/combining section 21 selects one of the frequency-domain information signals $S_5$ and $S_6$ on the basis of a control signal (not shown in the drawings), or synthesizes the frequency-domain information signals $S_5$ and $S_6$, thereby sending the selected signal or synthesized signal to the equalizing section 22 and the scaler 24.

The equalizing section 22 corrects a code error with respect to the FFT processing result $S_1$ on the basis of the output signal of the selecting/combining section 21. The scaler 23 processes the corrected result output from the equalizing section 22, thereby generating the I/Q signal $S_{23}$.

Furthermore, the scaler 24 divides the output signal of the selecting/combining section 21 by the interference wave power information $S_7$ (i.e., Itf(sub_c) which is a value indicating the influence by the interference wave), thereby generating a subcarrier signal intensity $S_{24}$ and sending it an error correcting encoder (not shown in the drawings) disposed at the later stage.

Since the equalizer 20 can lower the level of the reliability information of subcarriers which are being subject to larger interference wave power, erroneous determination in error correction encoder can be reduced and a BER of the error correcting encoder can be improved.

Furthermore, the interference wave detecting apparatus 10 can be also applied to various types of circuits or apparatuses other than the equalizer of FIG. 4.

Those skilled in the art will recognize that the above embodiments can be modified in various ways within the scope of the invention, which is defined in the appended claims.

What is claimed is:

1. An interference wave detecting apparatus comprising:
a first Fourier transformer configured to frequency-convert a received signal using a Fourier transform, to thereby generate a frequency-converted received signal;
an extractor configured to extract a known information signal from the frequency-converted received signal;
an interpolator configured to interpolate the known information signal in the frequency domain, to thereby generate a first transmission path estimation signal as a frequency-domain information signal;
an inverse Fourier transformer configured to inverse-Fourier-transform the known information signal, to thereby generate a time-domain information signal;
a waveform shaping section coupled to the inverse Fourier transformer and configured to receive the time-domain information signal and shape a waveform of the time-domain information signal, to thereby generate a shaped time-domain information signal;
a second Fourier transformer configured to Fourier-transform the shaped time-domain information signal, to thereby generate a second transmission path estimation signal as a frequency-domain information signal; and
a comparing-computing section coupled to the second Fourier transformer and configured to receive the frequency-domain information signal and compare the first transmission path estimation signal and the second transmission path estimation signal, to thereby generate an interference wave detection result which indicates a ratio of an interference wave of the received signal.

2. The interference wave detecting apparatus according to claim 1, wherein the shaping of the waveform by the waveform shaping section comprises:
receiving the time-domain information signal,
comparing a waveform of the received time-domain information signal with a threshold, outputting the waveform of the received time-domain information signal as it is when the waveform of the received time-domain information signal exceeds the threshold, and outputting a logical "0" or a suppressed signal level of the received time-domain information signal when the waveform of the received time-domain information signal does not exceed the threshold.

3. The interference wave detecting apparatus according to claim 2, wherein the threshold is a value determined by multiplexing an integral value of the received time-domain information signal in a predetermined time interval or a maximum value of the received time-domain information signal by a predetermined coefficient.

4. The interference wave detecting apparatus according to claim 1, wherein the interference wave detection result is obtained by comparing power levels of the first transmission path estimation signal and the second transmission path estimation signal, and dividing a dividend which is a larger one of the power levels by a divisor which is a smaller one of the power levels, thereby generating the interference wave detection result on the basis of a result of the dividing.

5. The interference wave detecting apparatus according to claim 1, wherein the interference wave detection result is obtained by comparing power levels of the first transmission path estimation signal and the second transmission path estimation signal, and dividing a dividend which is a smaller one of the power levels by a divisor which is a larger one of the power levels, thereby generating the interference wave detection result on the basis of a result of the dividing.

6. An equalizer comprising:
the interference wave detecting apparatus of claim 1;
a selecting/combining section coupled to the second Fourier transformer and the interpolator and configured to receive the first and second transmission path estimation signals and select one of the first and second transmission path estimation signals or to synthesize the first and second transmission path estimation signals, to thereby output the selected signal or the synthesized signal; and
a scaler configured to divide the selected signal or the synthesized signal by the interference wave detection result, to thereby generate a subcarrier signal intensity.

7. The equalizer according to claim 6 further comprising:
an equalizing section coupled to the selecting/combining section and configured to receive the selected signal or the synthesized signal and correct a code error of the frequency-converted received signal on the basis of the selected signal or the synthesized signal; and
another scaler configured to generate an I/Q signal from an output signal of the equalizing section.

8. An interference wave detecting method comprising the steps of:
receiving a signal and frequency-converting the received signal using a Fourier transform, thereby generating a frequency-converted received signal;
extracting a known information signal from the frequency-converted received signal;
performing interpolation to the known information signal in the frequency domain, thereby generating a first transmission path estimation signal as a frequency-domain information signal;
inverse-Fourier-transforming the known information signal, thereby generating a time-domain information signal;
shaping a waveform of the time-domain information signal, thereby generating a shaped time-domain information signal;

Fourier-transforming the shaped time-domain information signal, thereby generating a second transmission path estimation signal as a frequency-domain information signal; and
comparing the first transmission path estimation signal and the second transmission path estimation signal, thereby generating an interference wave detection result which indicates a ratio of an interference wave of the received signal.

9. The interference wave detecting method according to claim 8, wherein said shaping comprises:
receiving the time-domain information signal;
comparing a waveform of the received time-domain information signal with a threshold;
outputting the waveform of the received time-domain information signal as the shaped time-domain information signal when the waveform of the received time-domain information signal exceeds the threshold; and
outputting a logical "0" or a suppressed signal level of the received time-domain information signal as the shaped time-domain information signal when the waveform of the received time-domain information signal does not exceed the threshold.

10. The interference wave detecting method according to claim 9, wherein the threshold is a value determined by multiplexing an integral value of the received time-domain information signal in a predetermined time interval or a maximum value of the received time-domain information signal by a predetermined coefficient.

11. The interference wave detecting method according to claim 8, wherein said comparing comprises:
comparing power levels of the first transmission path estimation signal and the second transmission path estimation signal; and
dividing a dividend which is a larger one of the power levels by a divisor which is a smaller one of the power levels, thereby generating the interference wave detection result based on a result of the dividing.

12. The interference wave detecting method according to claim 8, wherein said comparing comprises:
comparing power levels of the first transmission path estimation signal and the second transmission path estimation signal; and
dividing a dividend which is a smaller one of the power levels by a divisor which is a larger one of the power levels, thereby generating the interference wave detection result based on a result of the dividing.

13. The interference wave detecting method according to claim 8, further comprising:
selecting one of the first and second transmission path estimation signals, or synthesizing the first and second transmission path estimation signals, thereby outputting a selected signal or a synthesized signal; and
dividing the selected signal or the synthesized signal by the interference wave detection result, thereby generating a subcarrier signal intensity.

14. The interference wave detecting method according to claim 13, further comprising:
correcting a code error of the frequency-converted received signal based on the selected signal or the synthesized signal; and
generating an I/Q signal based on the code error corrected frequency-converted received signal.

* * * * *